Sept. 11, 1934.    F. C. KRUSE    1,973,349
WATER CLOSET
Filed Nov. 3, 1932

Fred. C. Kruse
INVENTOR
BY
ATTORNEY

Patented Sept. 11, 1934

1,973,349

UNITED STATES PATENT OFFICE 1,973,349

WATER CLOSET

Frederick C. Kruse, Seattle, Wash.

Application November 3, 1932, Serial No. 641,066

14 Claims. (Cl. 4—73)

My present invention relates to improvements in water closets and more specifically to improved jet means for ejecting waste matter from the bowl thereof, together with improvements in the basin and trap of the bowl in order that the maximum efficiency of the jet means may be most advantageously utilized.

An object of the invention is to provide an ejector jet capable of effectively expelling waste matter from the bowl with a minimum expenditure of water.

A further object of the invention is to provide bowl emptying means which is more silent in operation than other means commonly employed.

A still further object of the invention is to provide bowl emptying means which aids materially in keeping the trap of the bowl clean and free from accumulation of waste matter therein.

A still further object of the invention is to provide bowl emptying means which effects a gradual and continual discharge of waste matter therefrom during the flushing operation, with a view to maintaining the trap seal at all times during such operation.

A still further and preferred object of the invention is to provide a closet bowl with a replaceable or interchangeable ejector jet, whereby a suitable jet installation may be provided for the bowl to adequately meet the conditions imposed by the available water pressure in any particular installation of the closet.

With these and other objects and advantages in view, my invention contemplates the use of a combined water and air jet which is so positioned in the closet bowl as to direct the jet stream therefrom into the mouth of the rising trap leg of the bowl. The combined jet comprises preferably an outer nozzle to which water is supplied by means of a duct communicating with either a pressure feed pipe to the bowl, or a supply pipe from a local tank, and an air nozzle the outlet of which is disposed within the water nozzle and the inlet of the same being disposed above the normal level of water within the bowl, said inlet being either interiorly or exteriorly of said bowl. The flow of water through the water nozzle will induct air through the air nozzle, and the combined mixture of water and air is directed by the force of the water stream into the mouth of the rising trap leg. The combined jet is positioned in the bowl so as to be at all times below the level of water in the bowl, thus insuring silent operation during such periods as the bowl is being flushed. The induction of air into the water stream as it passes through the water nozzle results in a very substantial increase in the kinetic energy and velocity of the water stream as it leaves the jet, and thereby increases the effectiveness of a given volume of water to expel the contents of the bowl out through the trap thereof.

While the jet means herein set forth may be employed in conjunction with closet bowls having traps of conventional design, my invention also contemplates improvements in the design of the trap itself, in order that the maximum efficiency of the jet means may be fully utilized. Accordingly I prefer to fashion the bowl with a substantially vertical rising trap leg, which communicates with the usual downward waste leg, with the usual dam therebetween to maintain a desired normal water level in the bowl, and the rising leg of the trap is decreased gradually in area toward the top thereof. As the mixture of water and air from the jet means enters the mouth of the rising trap leg the air tends to rise rapidly in this leg, thereby exerting a substantial lift to the waste being discharged therethru, and the gradually decreasing area in the rising leg tends to increase the velocity of flow therethru. The fact that the rising trap leg is substantially vertical insures that the air bubbles entering therein will rise throughout substantially the full area of this leg, thus utilizing the full effectiveness of the air as a prime lifter in expelling the contents of the bowl.

Further improvement in the character of the entrance to the rising trap leg is contemplated as aiding materially in drawing paper and other floating débris into the rising trap leg during the operation of flushing the closet bowl.

The invention thus resides in certain novel combinations and arrangements of parts as will hereinafter be more fully set forth and described.

In the accompanying drawing forming a part of this specification I have illustrated one complete example of the physical embodiment of my invention, as well as modified arrangements thereof, wherein the parts are combined and arranged according to the best mode I have thus far devised for the practical application of the principles of my invention.

Figure 1:
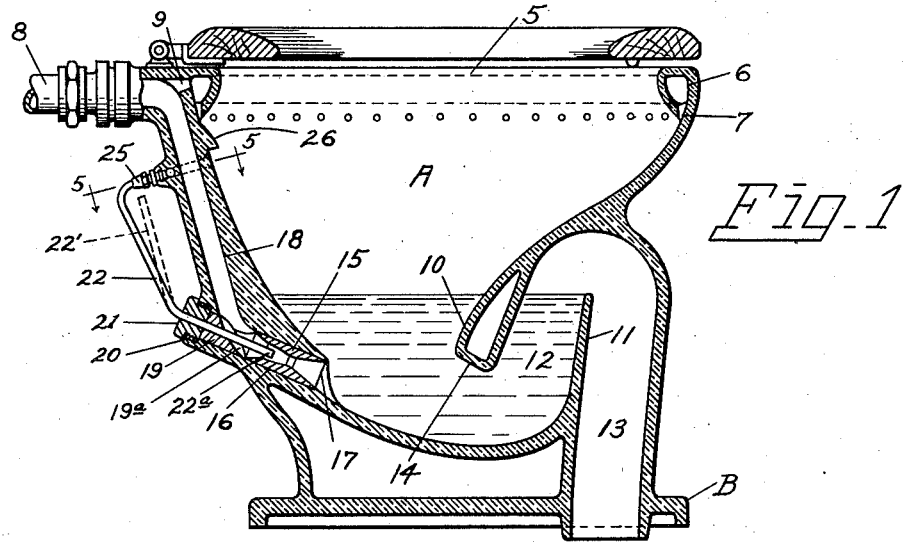
Figure 1 is a view in vertical section through a closet bowl embodying the features of my invention.

Referring to the drawing, A designates the closet bowl as a whole, which is supported by the usual pedestal B, and which, excepting such features as relate directly to the present invention, is fashioned generally according to conventional practice in sanitary bowl construction. The bowl is provided with an upper rim 5 surrounding the top edge thereof, which rim is hollow so as to incorporate the usual flush water chamber 6, and a series of ports 7 disposed along the under side of the rim 5 are adapted to direct streams of water over the interior of the bowl from the chamber 6. At the upper rear of the bowl the usual connection is provided for a water supply pipe 8, and a port 9 provides communication between the supply pipe and the flushing rim chamber 6.

The flushing rim in itself, as shown, embodies general practice and forms no material part of the present invention, aside from its cooperation with the waste ejecting means which will be hereinafter described.

I fashion the bowl with a trap by means of the inverted dam 10, which constitutes a part of the basin, and an upright wall or dam 11 which is positioned forwardly of the dam 10, thus forming a rising trap leg 12 therebetween, which leg communicates with a downward waste leg 13. The wall or dam 11 is of sufficient height to maintain the normal water level in the bowl well above the bottom of the dam 10, thus providing a water seal against the entrance of obnoxious odors from the waste pipe into the bowl.

Certain novel features of the invention reside in the fashioning of the rising trap leg 12. For instance, instead of disposing this leg diagonally upward from the trap of the bowl, I fashion the bowl so that the leg 12 is substantially vertical. I also gradually reduce the area of the leg 12 from bottom to top thereof, as may be seen from a study of the drawing. This arrangement is more suitably adapted to a utilization of the maximum efficiency of the waste ejecting means which constitutes an important feature of the invention.

The waste leg 13 is preferably vertically disposed and of uniform area throughout the length thereof, so as to offer the minimum of resistance to the passage of waste therethrough.

As a means of facilitating the entry of paper and other floating débris into the mouth of the rising trap leg 12, I fashion the dam 10 with an inclined face 14 of substantial area, as shown, beneath which such débris may pass without danger of becoming lodged thereon.

At the bottom rear of the bowl, and oppositely disposed from the mouth of the trap leg 12, I position the jet means. The jet includes a water nozzle, designated as a whole by the numeral 15, and which is positioned so as to direct a stream of water therefrom into the mouth of the rising trap leg 12, as shown in Figure 1. This figure illustrates the preferred form of my invention, in which form I contemplate the use of a removable nozzle, as 15, and accordingly I provide the bowl with a bore 16 extending from interior to exterior thereof and in which the nozzle 15 may be inserted, the bore 16 having a slight annular shoulder as at 17 against which the forward end of the nozzle 15 may abut to retain the same in position within the bore.

Water is supplied to the nozzle 15 by means of a duct 18 which provides a communication between the supply 8 and the bore 16, intersecting the latter immediately behind the nozzle 15. To offset the angularity between the bore 16 and the duct 18 I employ a filler plug 19 which is inserted in the bore 16 behind the nozzle 15, and which is provided with a concave forward surface 19a designed to effect a smooth flow of water from duct 18 into the nozzle 15. The exterior end of the bore 16 is provided with interior threads, or a threaded annular insert as 20, in which a cap plug 21 may be threaded to retain the filler plug 19 and the nozzle 15 securely in position. A washer or gasket (not shown) may be carried by the cap 21 to insure a leakproof closure of the bore 16.

Figure 5:
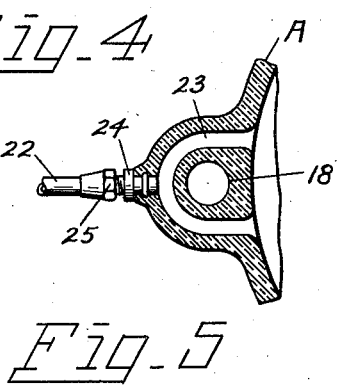
Figure 5 is a sectional view, as at line 5—5 of Figure 1, showing one form of communication between the air nozzle and the interior of the closet bowl.

The ejector jet also includes an air nozzle which is disposed within the bore of the water nozzle 15. As shown in Figure 1, the air nozzle comprises a small pipe or tube 22 which extends through central bores of the filler plug 19 and cap plug 21, and is thereby supported in proper alignment with the bore of nozzle 15, with a discharge tip 22a thereof disposed within the bore of the water nozzle 15. The intake end of the tube 22 is disposed above the normal water level of the bowl A and may be arranged to draw air from the interior of the bowl, or exteriorly thereof. Thus, as shown in Figure 5, the bowl A is provided with a port 23 surrounding the water duct 18 and communicating with the interior of the bowl. A threaded nipple 24 having a bore communicating with the port 23 is provided, to which the tube 22 may be attached by means of the usual sleeve-nut 25. In connection with this arrangement the bowl is fashioned with a shield 26 which is positioned above the mouths of the air intake port 23, to direct the water from the flushing rim beyond this port, thus preventing water from entering therein. In this manner the air for the air nozzle is drawn from the interior of the bowl, thereby assisting to a certain extent in withdrawing obnoxious odors therefrom.

While the arrangement just described depicts the preferred form, the intake to tube 22 may be disposed exteriorly of the bowl, in which case tube 22 merely terminates at sufficient height above the normal water level within the bowl to insure against overflow therefrom, and in this instance the tube is indicated by dotted lines, as at 22' in Figure 1.

Figure 4:
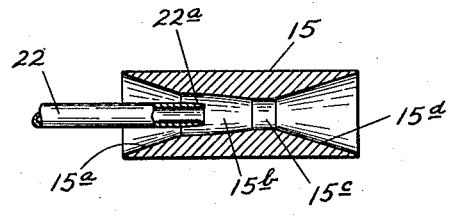
Figure 4 is an enlarged sectional view of the jet means contemplated in my invention, with the air nozzle shown partly in section and partly in exterior elevation, for clarity of description.

In order to obtain maximum efficiency from the combined water and air jet, I have devised a preferred design and arrangement of these units. Reference is invited to Figure 4, where the water nozzle 15 is shown in longitudinal section together with a portion of the air nozzle 22, this view being intended to clearly show the preferred embodiment in approximately the size and proportions adapted to be installed in a closet bowl. It will be seen that the nozzle 15 is fashioned with an inwardly tapered inlet portion 15a, a slightly tapering bore 15b terminating in a restricted nozzle passage 15c, and an outwardly tapering discharge portion 15d, thus approximating a Venturi tube.

The air nozzle 22 is shown with the tip 22a thereof projecting into the bore 15b of nozzle 15, and the tip 22a is preferably exteriorly tapered toward the end thereof so as to permit a smooth flow of the water stream thereover, a portion of the nozzle 22 being shown in section to illustrate this feature.

With respect to the proportions of the air nozzle 22 and water nozzle 15, I have found that the diameter of the air nozzle 22, using a relatively thin tube, may be slightly more than half the diameter of the intake end of bore 15b, and the area through bore 15c should be slightly more than the annular area within bore 15b at that point immediately surrounding the tip 22a of nozzle 22.

It will be appreciated, however, that these relative proportions are approximate only, and may be varied considerably, since the attainment of the best efficiency depends largly upon the available water pressure for each particular closet installation. Therefore, it is for this reason that I preferably employ the removable type jet, as water nozzles of various bore diameters may be installed in the closet bowl, utilizing such size as may by test be found particularly adapted for use with a given water pressure, and the size of the air nozzle may also be varied to obtain proper co-action with a water nozzle of any suitable proportions.

It is pointed out also, that with given sizes of water and air nozzles installed in a closet bowl, adjustment may be made to obtain the best efficiency from the combined unit. In this instance the tip 22a of the air nozzle 22 may be advanced or retracted with respect to its position within the slightly tapered bore 15b of the water nozzle 15, until that position is found where the combined water and air stream issuing from the unit appears to exert the greatest force.

Referring again to Figure 1, it will be seen that I position the combined water and air jet above the bottom of the bowl trap, and align the same so as to direct the water and air stream therefrom into the opening of the rising trap leg 12. I prefer this arrangement since it insures that all waste settling into the trap will be directly in the path of the stream from the jet as it plays into the trap leg 12.

A closet bowl embodying the features of my invention operates during the flushing operation as follows: Water enters through the supply pipe 8, a portion of the flow passing through the port 9 into the flushing rim chamber 6, being distributed through the ports 7 over the entire interior of the bowl A, thus washing down the walls of the same. Simultaneously, the major portion of the water flow passes down the duct 18 and through the water nozzle 15, spreading out from the tapered outlet 15d thereof, and playing directly into the mouth of the trap leg 12, the expanded stream covering substantially the entire opening into this leg 12. As the water flow passes over the tip 22a of the air nozzle 22, suction is created therein, inducting air which is drawn into the water stream before it leaves the water nozzle 15. The induction of air into the water stream at this point definitely increases the kinetic energy of the jet stream, which dislodges all waste from the trap of the bowl and sweeps the same into the rising trap leg 12, where the air bubbles rise rapidly, thus increasing the velocity of the water flow in this leg and effectively expelling the waste matter into the waste leg 13, from whence it passes into the usual waste pipe (not shown).

Throughout the action of the jet, water continues to flow from the flushing rim, and of course as soon as the water and waste pass over the dam 11 and down the waste leg 13 there is a siphon action in the leg 13 which also assists in expelling the contents of the bowl, although the siphon action is not, and need not be, as strong as in regular siphon type water closets, since there is no choke-off at the bottom of waste leg 13 to increase the siphon action, the water and air stream playing into the leg 12 being deemed sufficient to expel the waste from the bowl.

Since the rising trap leg 12 is substantially vertical, it will be seen that the air bubbles entering this leg with the water stream from the jet will rise throughout the full area of leg 12, thus being very effective as a prime lifter. Also, the reduction in area towards the top of leg 12 will effectively increase the velocity in flow of both water and air therethru. This trap design renders it possible to utilize the full force and effect of the water and air stream from the jet in expelling waste from the bowl. It is obvious that a diagonally disposed rising trap leg would not provide this advantage, since the air bubbles would travel upward along the top side of such a leg, and would therefore be of little effect in urging waste matter therethrough.

It is further pointed out that the direct action and force of the water and air stream will expel the waste matter from the bowl without also expelling a large volume of water therefrom, and with the flow from the flushing rim tending to fill the bowl, the water level in the bowl does not fall below the inverted dam 10, and consequently the trap seal is not broken so as to permit the entry of foul odors from the waste pipe. This further provides that the ejector jet will always remain below the water level in the bowl, thus insuring silent jet action.

It will be apparent also, that with a substantially vertical rising trap leg, as shown and described herein, the waste will have less tendency to drag along the sides thereof, as would be the situation in a diagonally disposed leg, and therefore the use of the vertical leg 12 promotes cleanliness in the trap of the bowl. The mixing of air with the water stream passing through the rising trap leg also aids in promoting sanitation.

Figure 2:
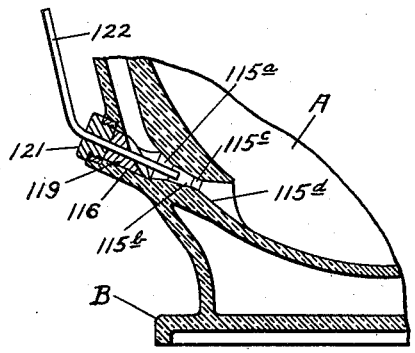
Figure 2 is a fragmentary sectional view showing a modified arrangement of the jet means of my invention.

While I have thus far described the preferred form of my invention, I do not limit myself to the precise arrangement set forth. Thus, in Figure 2, I illustrate a modified arrangement of the jet means. In this instance the water nozzle is shown to be formed as an integral part of the bowl, and fashioned with an inwardly tapered inlet portion 115a, a slightly tapering bore 115b, a restricted nozzle bore 115c, and an outwardly tapering discharge portion 115d. A bore 116 is provided at the rear of this nozzle, so as to facilitate the fashioning of the same while constructing the bowl, and likewise to receive a filler plug 119 and the cap plug 121 which support the air nozzle tube 122 in proper relation within the water nozzle. The arrangement is thus similar in all respects to that shown in Figure 1, except that the water nozzle is fashioned integral with the bowl as a part thereof, instead of being removable as in the preferred form. This latter described arrangement may lend itself to more economical manufacture and would be ideally adapted to such closet installations where a known and dependable water pressure is to be had.

Figure 3:
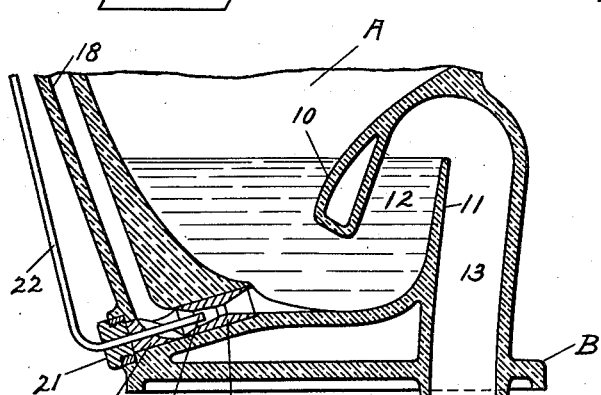
Figure 3 is a vertical sectional view through the lower portion of a closet bowl showing a further modified arrangement of the features of my invention.

Likewise, Figure 3 shows a modified arrangement from that of Figure 1, the features of the invention being similar in all respects, with the exception that the ejector jet is here shown as positioned lower in the trap of the bowl, and closer to the mouth of the trap leg 12. Such arrangement may be advantageous where the bowl is to be installed in places where the available water pressure is low, and the positioning of the jet closer to the rising leg of the trap may serve to increase the force and velocity of the jet stream in its passage through the rising trap leg.

Further modifications in the manner of constructing and arranging the various parts may obviously be made without departing from the spirit and scope of the invention as embraced in the appended claims.

In all cases, however, the action and function of the various parts is similar, and a waste expelling means is provided which will operate effectively on much less water, both as to volume and pressure thereof, than many existing types of closets.

It is believed that the foregoing description is sufficiently clear so as to enable anyone skilled in the art to which the invention appertains to make and use the same, with reference to the accompanying drawing.

Having thus fully described my invention, I claim:

1. In a sewerage disposal apparatus adapted to be flushed by water and having a hydraulic jet in connection therewith, the method of increasing the kinetic energy of the jet stream by introducing air into said jet stream from an air nozzle disposed within said hydraulic jet.

2. In a sewerage disposal apparatus adapted to be flushed by water and having a water trap with a rising discharge leg and a waste outlet communicating with said rising trap leg and having a hydraulic jet adapted to direct a water stream into the rising discharge leg of said trap, the method of increasing the velocity of flow through said rising trap leg by introducing air into the water passing thru said hydraulic jet, said air being introduced from a nozzle disposed within the said hydraulic jet.

3. In a water closet, a bowl having a waste receiving cavity, a waste outlet communicating with said waste receiving cavity, a water nozzle adapted to direct a water stream towards and into the said waste outlet, means for conducting water to said nozzle, and means including an air nozzle disposed within the water nozzle and adapted to introduce air into the water stream passing through said water nozzle.

4. In a water closet, a bowl having a waste receiving cavity, a waste outlet communicating therewith, a water nozzle adapted to direct a stream of water through said waste receiving cavity and into said waste outlet, an air nozzle having its discharge disposed within said water nozzle, means for conducting water to said water nozzle, and means for introducing air into said air nozzle.

5. In a water closet, a bowl having a water trap, a waste outlet communicating with said trap, an ejector jet, being positioned in the bowl so as to direct a jet stream through said trap and into the waste outlet, said jet comprising an outer nozzle and an inner nozzle within said outer nozzle, means for conducting water to one of said nozzles, and means for conducting air to the other of said nozzles.

6. In a water closet, a bowl having a water trap, said trap being fashioned in the bowl with a substantially vertical rising discharge leg, a downwardly directed waste leg communicating with said rising trap leg, an ejector jet in the bowl, being positioned therein so as to direct a jet stream therefrom into the mouth of the rising trap leg, said ejector jet comprising an outer nozzle and an inner nozzle disposed within the outer nozzle, means for conducting water to one of said nozzles, and means for conducting air to the other of said nozzles.

7. In a water closet, a bowl having a water trap fashioned with a substantially vertical rising discharge leg, said rising trap leg having upwardly converging walls, a downwardly directed waste leg communicating with said rising trap leg, an ejector jet, being so positioned in the bowl as to direct a jet stream towards and into the mouth of said rising trap leg, said ejector jet comprising an outer nozzle and an inner nozzle disposed within the outer nozzle, means for conducting water to one of said nozzles, and means for conducting air to the other of said nozzles.

8. In a water closet, a bowl having a water seal trap, a waste leg communicating with said trap, an ejector jet, being so positioned in the bowl as to direct a jet stream through said trap, said jet comprising a water nozzle and an air nozzle disposed within the water nozzle, a water passage in the bowl leading to said water nozzle, an air conduit communicating with said air nozzle, and the inlet to said air conduit being disposed above the normal water level within the bowl.

9. In a water closet, a bowl having a water trap therein, a waste leg communicating with said trap, an ejector jet, being so positioned in the bowl as to direct a jet stream through said trap, said jet comprising a water nozzle and an air nozzle disposed within the water nozzle, a water passage in the bowl leading to said water nozzle, a port arranged in the bowl above the water trap and having communication with the interior of said bowl, means providing communication between said port and said air nozzle, and a shield on the bowl above the inlet to said port.

10. In a water closet, a bowl having a water trap, a water nozzle formed integrally with said bowl and being adapted to direct a water stream through said trap, a water passage in the bowl leading to said water nozzle, an air nozzle disposed within said water nozzle, and means for conducting air to said air nozzle.

11. In a water closet, a bowl having a water trap and a waste outlet therefrom, a bore extending from interior to exterior of said bowl, a removable water nozzle disposed in said bore and being adapted to direct a water stream through said water trap, a water passage in the bowl leading to said bore outwardly of said water nozzle, an air nozzle disposed within said water nozzle, means for conducting air to said air nozzle, and means closing the outer end of said bore.

12. In a water closet; a bowl having an ejector jet therein, said jet comprising a water nozzle having an inwardly tapering inlet bore, a slightly tapering intermediate bore terminating in a restricted nozzle bore and an outwardly tapering discharge bore, and an air nozzle having the tip thereof disposed within the intermediate bore of said water nozzle; means for conducting water to said water nozzle; and means for conducting air to said air nozzle.

13. In a water closet; a bowl having a water trap; an ejector jet in the bowl adapted to direct a jet stream through said trap, said jet comprising a Venturi water nozzle and an air tube having a discharge tip thereof disposed within said water nozzle and the inlet end of said air tube being disposed above the level of water in said water trap; and means for conducting water to said water nozzle.

14. In a water closet having a bowl provided with an ejector jet as set forth in claim 12, the method of adjusting said jet for maximum efficiency which comprises advancing or retracting the tip of said air nozzle within the slightly tapered intermediate bore of said water nozzle until that position is found where it is determined that the jet stream issuing from said jet exerts the greatest force.

FREDERICK C. KRUSE.